(12) United States Patent
Morikawa et al.

(10) Patent No.: US 8,015,257 B2
(45) Date of Patent: Sep. 6, 2011

(54) IMAGE STORAGE PROGRAM AND IMAGE PROCESSING APPARATUS

(75) Inventors: Takeshi Morikawa, Takarazuka (JP); Hironobu Nakata, Itami (JP); Kiyoshi Emori, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 1517 days.

(21) Appl. No.: 10/409,678

(22) Filed: Apr. 9, 2003

(65) Prior Publication Data
US 2003/0220902 A1 Nov. 27, 2003

(30) Foreign Application Priority Data

Apr. 10, 2002 (JP) ................................. 2002-107529

(51) Int. Cl.
*G06F 15/16* (2006.01)
(52) U.S. Cl. ...................................................... 709/213
(58) Field of Classification Search .................. 709/213, 709/214, 216, 224; 711/100, 147, 148, 154, 711/202, 203, 206, 209
See application file for complete search history.

(56) References Cited

U.S. PATENT DOCUMENTS
2003/0020949 A1* 1/2003 Goto ............................ 358/1.15

FOREIGN PATENT DOCUMENTS
JP 9-022465 1/1997

OTHER PUBLICATIONS

"Microsoft Extensible Firmware Initiative FAT 32 File System Specification." Microsoft Corporation. Dec. 6, 2000.*
"DOS-MS-DOS A Lost Language." Downloaded from the Internet <http://www.dewassoc.com/support/dos_commands.htm>. 2000.*
"How to Download & Install Programs." Downloaded from http://dwightblackburn.com/download.htm.*

* cited by examiner

*Primary Examiner* — William Vaughn, Jr.
*Assistant Examiner* — Scott Christensen
(74) *Attorney, Agent, or Firm* — Morrison & Foerster LLP

(57) ABSTRACT

Multiple user boxes are created beforehand in the hard disk drive of the MFP. The user specifies his own user box and saves image data therein. If the user extracts the image data from his user box and moves it to a folder on his own personal computer, the MFP 1 detects this action. When this user box is specified during a subsequent reading of image data, the storage destination for the image data is automatically deemed to be the folder on the personal computer to which the image data was previously moved.

12 Claims, 8 Drawing Sheets

IMAGE STORAGE PROGRAM AND IMAGE PROCESSING APPARATUS

The present application claims priority to Japanese Patent Application No. 2002-107529 filed Apr. 10, 2002, the entire content of which is hereby incorporated by reference.

BACKGROUND OF THE INVENTION

1. Field of the Invention

The present invention pertains to an image storage program and an image processing apparatus, and more particularly, to an image storage program and image processing apparatus that can store images in a registered storage destination.

2. Description of the Related Art

An MFP (multi-function peripheral) including a hard disk is known in the conventional art. In this type of MFP, image data read by a scanner is stored temporarily on the hard disk in the MFP. The user accesses the MFP's hard disk from the user's own PC (personal computer) via a LAN (local area network) or the like, moves the stored image data to the PC, and performs editing or other tasks with regard to such data.

However, in the conventional technology described above, the problem exists that after the image data is stored temporarily on the hard disk, the operation to extract the image data onto the PC must be performed for each item of image data, which is troublesome for the user.

SUMMARY OF THE INVENTION

A principal object of the present invention is to provide an image storage program and image processing apparatus that permit the amount of effort required of the user to be reduced.

Accordingly, in order to resolve the problem identified above and attain the above object, the image storage program of the present invention causes the following steps to be executed by a computer: a registration step in which a storage destination for image storage is registered; a storage step in which the storage destination registered in the registration step is specified and an image is stored; a detection step in which it is detected that the data has been moved from the storage destination to a different location; and an update step in which the registered storage destination is updated based on detection of the above move during the detection step.

A notification step in which a notification is issued when the registered storage destination is updated in the update step may also be performed by the computer.

It may be determined, based on whether or not the image stored in the registered storage destination has been deleted after the moving of the data has been detected, whether or not the image storage destination is to be updated in the update step to a different location, or to both a different location and to the storage destination registered in the registration step.

When it is detected in the detection step that the data has been moved from the storage destination to multiple different locations, these multiple locations may be set in the update step as the storage destinations for image storage.

The image processing apparatus of the present invention includes registration means that registers a storage destination for image storage, a storage means that specifies a storage destination registered by the registration means and store images, detection means that detects that data has been moved from the storage destination to a different location, and updating means that updates the registered storage destination based on detection of movement of the data by the detection means.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
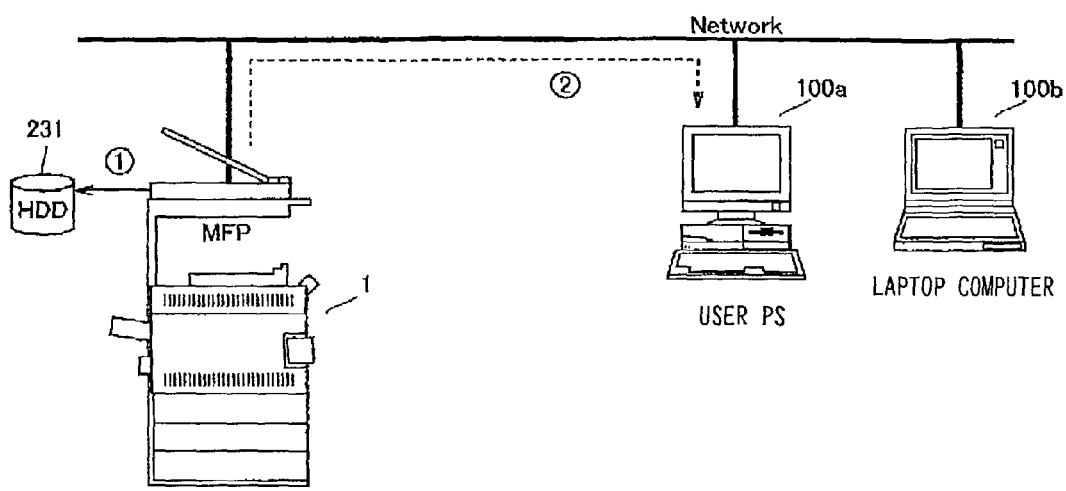
FIG. 1 is a drawing to describe the basic concept of an embodiment of the present invention.

FIG. 1 is a drawing that describes that basic concept of an embodiment of the present invention. Referring to the drawing, an MFP 1 and personal computers 100*a* and 100*b* are connected to a network such as a LAN. A hard disk drive (HDD) 231 is connected to (or incorporated into) the MFP 1, and image data read by the scanner of the MFP 1 is stored temporarily in the hard disk drive 231.

A plurality of user boxes (folders) are created beforehand for each user in the hard disk drive 231. A user saves read image data to his user box by specifying his own user box. A user extracts image data from his user box and moves it to a folder on his personal computer by operating his personal computer.

Such movement of the image data is detected by the MFP 1, and when that user box is specified the next time that image data is read, the storage destination for the image data automatically becomes the folder on the personal computer to which the image data was previously moved. Furthermore, notification that the image data storage destination has changed is sent to the user.

In other words, in this embodiment, in an MFP in which read image data can be stored in a hard disk drive, information regarding a storage destination registered in advance for image data is automatically updated based on operations performed with respect to the image data after storage. Furthermore, a notification is sent to the user after updating has occurred. In this way, the amount of work that must be performed by the user in moving image data is reduced.

It is also acceptable if the data in the user box is automatically deleted at this time.

It is preferred that the specification of the user box be performed using a one-touch operation. It may be determined, based on whether or not the image data stored in the user box has been deleted after the moving of the image data was detected, whether or not the image data storage destination is to be updated to a folder on the personal computer to which the image data was moved, or to both that folder and to the user box. In other words, if the image data in the user box has been deleted, the image data storage destination is set to be only the folder on the personal computer. On the other hand, if the image data in the user box has not been deleted, the image data is stored in both the folder on the personal computer and in the user box.

If the image data has been moved from the user box to multiple different locations, all of those multiple different locations may be set as storage locations for the image data.

The data transmission/receiving system of one embodiment of the present invention will be described below.

Figure 2:
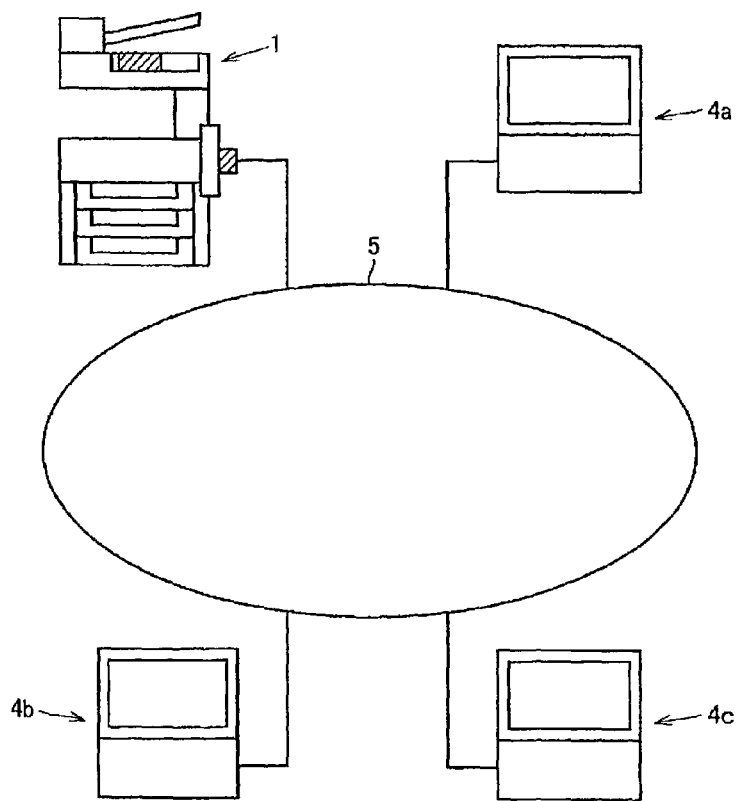
FIG. 2 is a drawing that shows the data transmission/receiving system of one embodiment of the present invention.

FIG. 2 shows the construction of a data transmission/receiving system comprising an MFP 1 that functions as a data sending apparatus and personal computers 4a-4c that function as data receiving apparatuses. In FIG. 2, an example is shown in which only one MFP 1 is connected to the network 5, but a plurality of MFPs may be connected to the network 5. The various apparatuses on the network 5 are assigned unique identification information (ID information) that specifies a particular apparatus. Using this ID information, apparatuses on the network 5 can identify each other.

Figure 3:
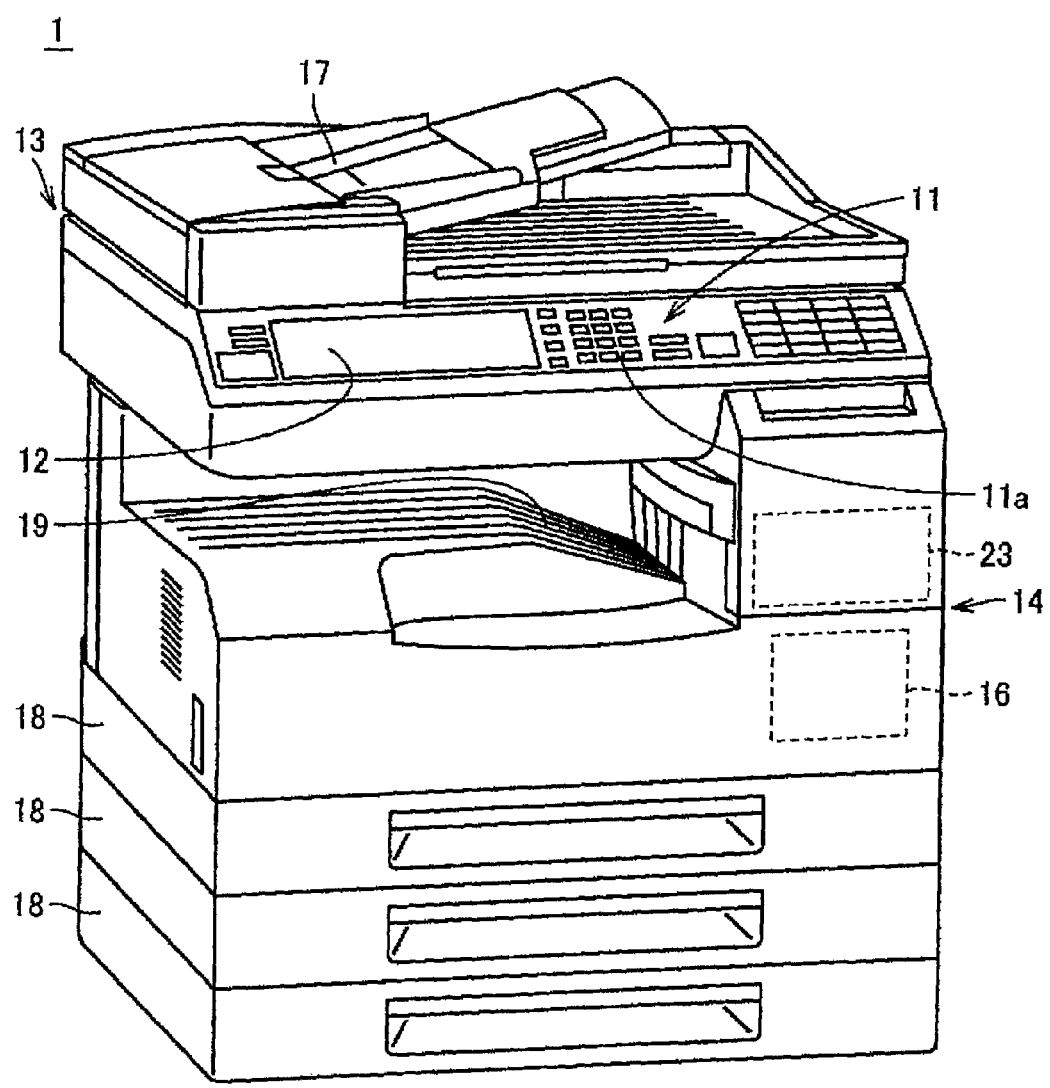
FIG. 3 is an external view of an MFP 1.

FIG. 3 is an external view of the MFP 1 shown in FIG. 2. The MFP 1 is a multi-function apparatus that combines the functions of a scanner, copier, printer and facsimile machine, for example, and can transmit and receive data over a network.

The MFP 1 includes, as shown in FIG. 3, a plurality of keys 11a, an operation unit 11 that receives input of various instructions and data comprising characters and numbers via user operation of these keys, a display 12 that displays user instruction menus, information regarding obtained images and the like, a scanner 13 that obtains image data through photoelectric reading of an original document, and a printer 14 that prints images onto recording sheets based on image data.

A feeder 17 that sends original documents to the scanner 13 is disposed on the top surface of the MFP 1 main unit. A paper supply unit 18 that supplies recording sheets to the printer 14 is disposed at the bottom part of the MFP 1 main unit. A tray 19 onto which recording sheets on which images have been printed by the printer 14 are ejected is disposed near the center of the MFP 1 main unit. A communication unit 16 that transmits and receives image data and the like to and from external apparatuses over the network, as well as a storage unit 23 that stores image data and the like, are disposed inside the MFP 1 main unit. In addition, while not shown, the MFP 1 has a network interface, and the communication unit 16 is connected to the network via this network interface, which enables transmission and receipt of various types of data between the MFP 1 and external apparatuses.

The display 12 is used to display various types of information including a list of data transmission recipients. The operation unit 11 is used for various types of input including selection of recipients by the user. These components function as key elements of the user interface.

The scanner 13 obtains image data via photoelectric reading of an original document containing image information such as photographs, characters or drawings. Obtained image data (density data) is converted into digital data by an image processor not shown, and after various types of public-domain image processing are performed thereto, the image data is either sent to the printer 14 or the communication unit 16 and supplied for image printing or data transmission, or is stored in the storage unit 23 for later use.

The printer 14 prints images onto a recording sheet based on image data obtained via the scanner 13, image data received from an external apparatus via the communication unit 16, or image data stored in the storage unit 23.

The communication unit 16 sends and receives facsimile data via public telephone lines, or sends and receives data over a network such as a LAN or the Internet to and from external apparatuses connected to the network using e-mail or the like. In this way, the MFP 1 functions not only as a facsimile machine that carries out normal facsimile communication, but also as a terminal for the sending and receiving of e-mail. Therefore, it can send and receive various types of image data as an attached file to an e-mail. While the network communication carried out by the MFP 1 may be land line-based or wireless, the example shown uses land line-based communication.

Figure 4:
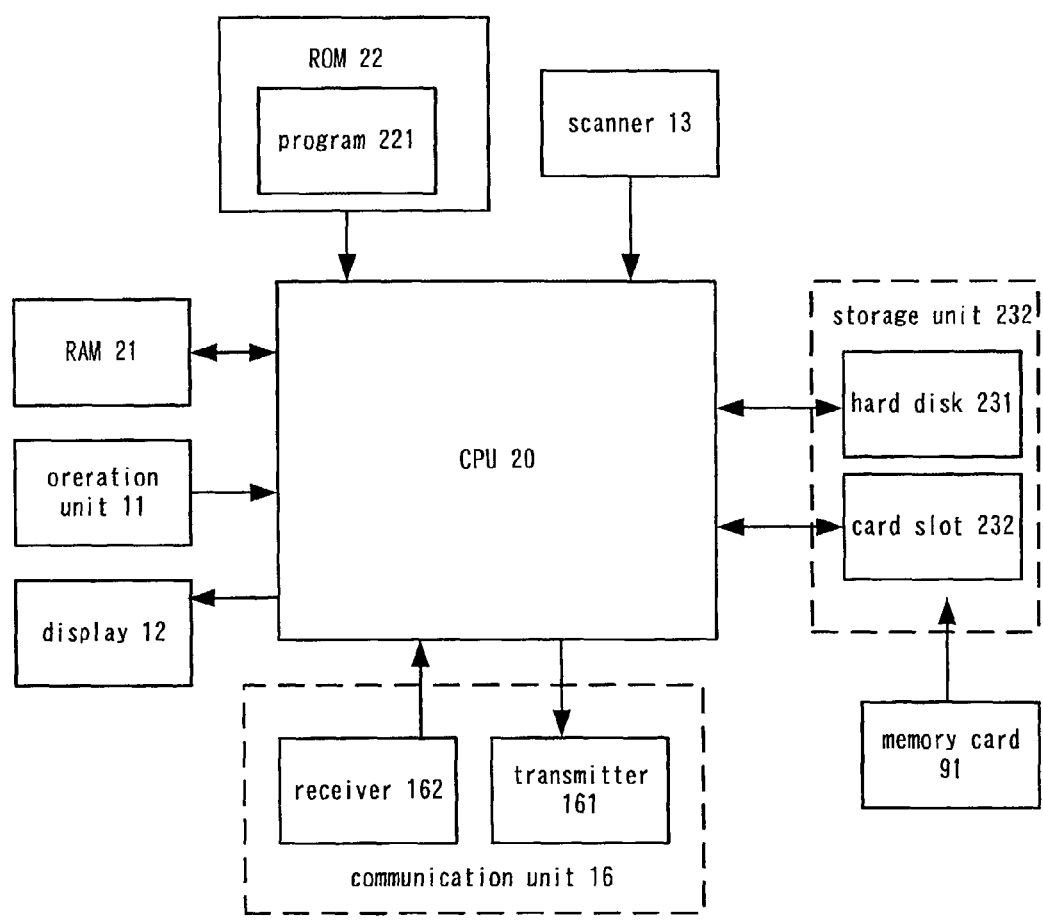
FIG. 4 is a block diagram that, among the various components of the MFP 1, shows mainly the components pertaining to this embodiment.

FIG. 4 is a block diagram that, among the various components of the MFP 1, shows mainly the components pertaining to this embodiment. The MFP 1 includes a CPU 20 that performs various calculations as well as overall control of the MFP 1. A RAM 21 that stores various types of data and a ROM 22 that stores a program 221 are connected to the CPU 20. The operation unit 11, display 12 scanner 13 and a storage unit 232 are also connected to the CPU 20. The storage unit 232 comprises a hard disk 231 on which image data and the like are saved and a card slot 232 by which information is read from a memory card 91. The RAM 21 is a non-volatile memory.

Through the construction described above, various types of data can be sent and received among the RAM 21, scanner 13, hard disk 231 and memory card 91 inserted in the card slot 232 under the control of the CPU 20. The information stored in the RAM 21, hard disk 231 or memory card 91 is displayed on the display 12 under the control of the CPU 20.

Furthermore, the communication unit 16 that includes a transmitter 161 and a receiver 162, which are used to transmit and receive data to and from external apparatuses connected over a network, is also connected to the CPU 20.

Figure 5:
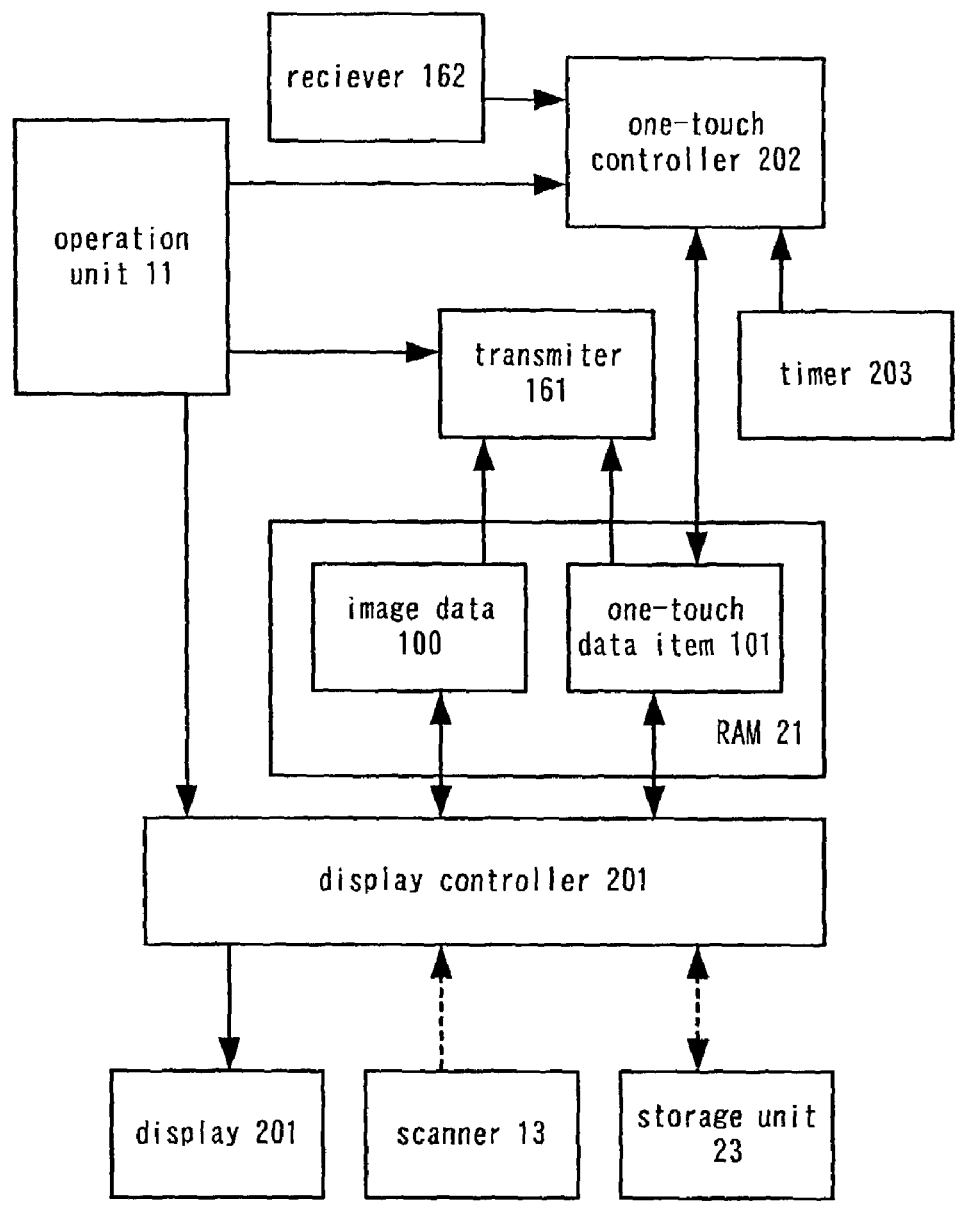
FIG. 5 is a drawing that shows the functions implemented by the CPU 20 operating in accordance with the program 221 in the ROM 22, together with other functions.

FIG. 5 shows the functions that are implemented by the CPU 20 operating in accordance with the program 221 stored in the ROM 22, as well as other functions. Among the functions shown in FIG. 5, the display controller 201, one-touch controller 202 and timer 203 are functions realized by the CPU 20 or the like.

The display controller 201 obtains image data 100 from the scanner 13 or storage unit 23, and transfers this image data to the RAM 21, or saves image data 100 stored in the RAM 21 in the storage unit 23. It also has a function to identify whether or not image data in the image storage destination registered as a one-touch data item 101 described below has been transferred to a personal computer, and correct the one-touch data item 101.

The transmitter 161 obtains a corresponding storage destination from among the one-touch data items 101 based on the number of the user box selected by the user through operation of the keys 11a on the operation unit 11 while viewing the displayed list of storage destinations on the display 201, and sends image data to the address represented by the selected one-touch data item 101.

Figure 6:
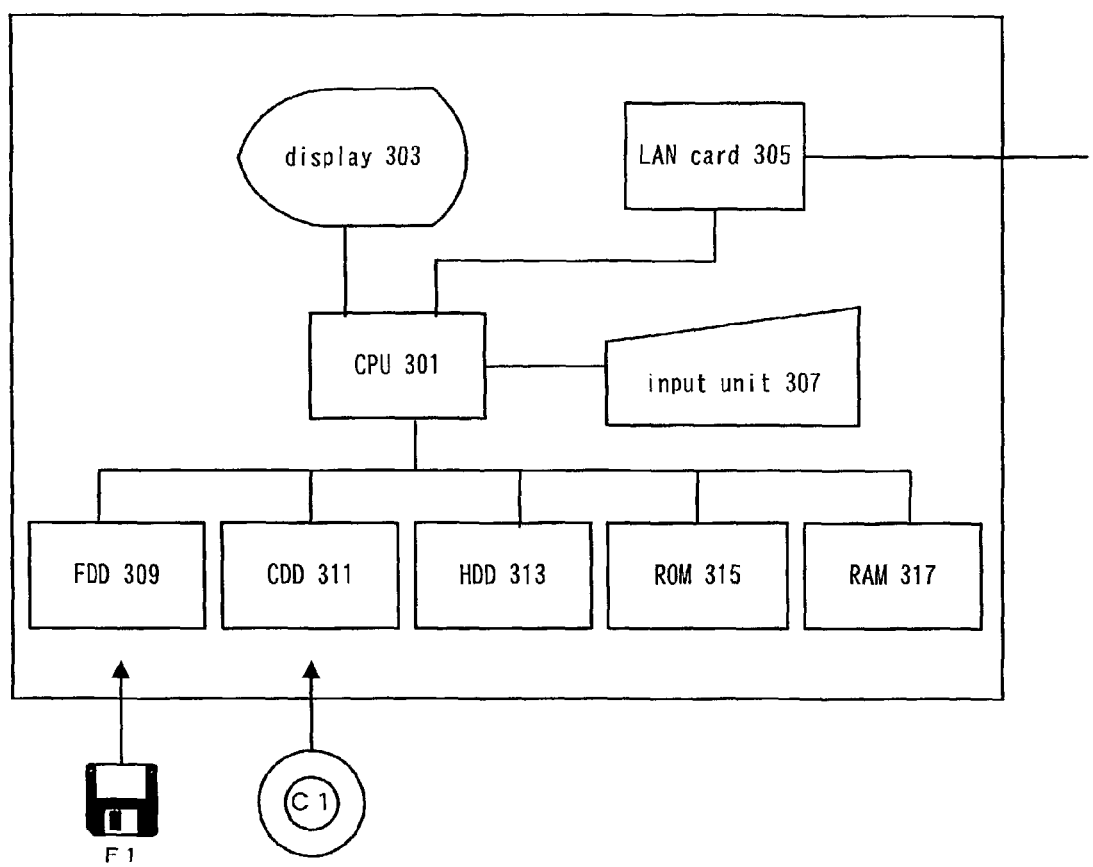
FIG. 6 is a block diagram showing the construction of a personal computer.

FIG. 6 is a block diagram that shows one hardware construction of a personal computer.

With reference to the drawing, the personal computer includes a CPU 301 that performs overall control of the apparatus, a display 303, a LAN card 305 to connect to a LAN, an input unit 307 comprising a keyboard and a mouse or the like, a flexible disk drive 309, a CD-ROM drive 311, a hard disk drive 313, a ROM 315 and a RAM 317.

Image data and programs recorded on a flexible disk (F1) can be read by the flexible disk drive 309, and image data and programs recorded on a CD-ROM (C1) can be read by the CD-ROM drive 311.

Figure 7:
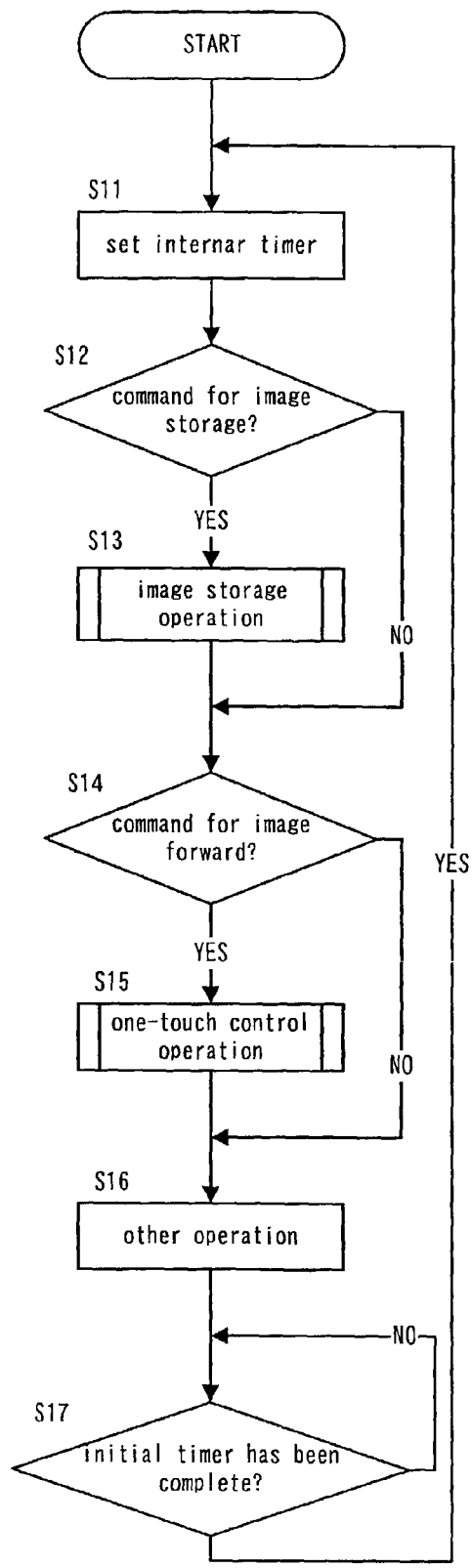
FIG. 7 is a flow chart showing the operations performed after booting of the MFP 1.

FIG. 7 is a flow chart that shows the operations of the MFP 1 after it is booted. The normal operations of the MFP 1 after booting will be described with reference to FIG. 7.

First, the MFP 1 sets in step S11 the internal timer that is used for repeated execution of necessary operations. It is determined in step S12 whether or not a command for image storage has been received, and if such a command has been received, the image storage operation (step S13) is performed. It is determined in step S14 whether or not an image forward command has been received, i.e., specifically, whether or not an image forward command has been received by the MFP 1 from any of the personal computers 4a-4c over the network shown in FIG. 2. If such a command has been received, the one-touch control operation (step S15) is carried out.

In step S16, other operations such as the operations of the scanner or the communication unit that are needed in order to operate the MFP 1 are performed. It is then determined in step S17 whether or not the internal timer has completed its timing cycle, and if it has, the CPU 20 returns to step S11 and repeats the above operations.

Figure 8:
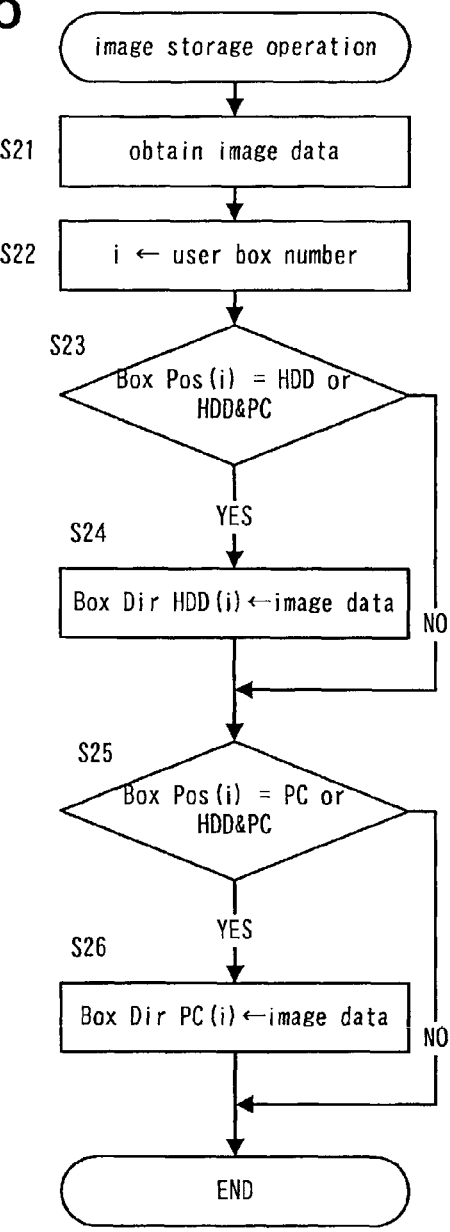
FIG. 8 is a flow chart showing in detail the image storage operation (S13) shown in FIG. 7.

FIG. 8 is a flow chart that shows in detail the image storage operation (step S13) shown in the flow chart of FIG. 7. The operations of the MFP 1 when the user stores image data 100 will be described with reference to FIG. 8. First, when an image storage command is issued by the user through operation of the operation unit 11, the scanner 13 reads the images of the original document to obtain image data 100 (step S21).

Figure 9:
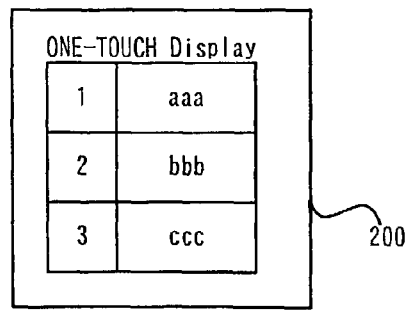
FIG. 9 is a drawing showing an example of the user box display.

At the same time, a list of the numbers of the user boxes that can be selected as a storage destination at that time is displayed on the display screen 200 of the display 12 at all times, as shown in FIG. 9, for example. The user selects a desired storage destination using the keys 11a while viewing the display of the user boxes on the display screen 200. In other words, in this example, the number of a user box corresponds to the number on a key 11a. In the example shown in FIG. 9, when the user presses the key that is equivalent to '2', processing to select the user box having a user number 2 is carried out.

Upon receiving such selection input by the user via the operation unit 11, the transmitter 161 obtains the user number (i) (a number by which to specify a user box) for the storage destination (step S22 shown in FIG. 8).

User number (i) will be explained here. Box Pos (i) indicates the image storage destination having the user number (i). If the description of Box Pos (i) is 'HDD', that means that the storage destination is the hard disk 231. Where it is 'PC', that means that the storage destination is one of the personal computers (data receiving apparatuses) 4a, 4b or 4c. Where it is 'HDD & PC', that means that image data is to be stored both on the hard disk and on one of the personal computers.

The default value for Box Pos (i) is 'HDD'.

In addition, Box Dir HDD (i) indicates the folder name of the image storage destination on the hard disk 231 having the user number (i), and Box Dir PC (i) indicates the name (or number) that specifies the personal computer comprising an image storage destination having a user number (i), and a folder name.

In step S23 shown in FIG. 8, it is determined whether or not 'HDD' is included in the image storage destination corresponding to the specified user number (i). If it is included, the image data is stored on the hard disk in step S24. It is similarly determined in step S25 whether or not 'PC' is included in the image storage destination. If it is included, the image data is directly forwarded to the folder on the registered personal computer by the transmitter 161 (step S26).

Figure 10:
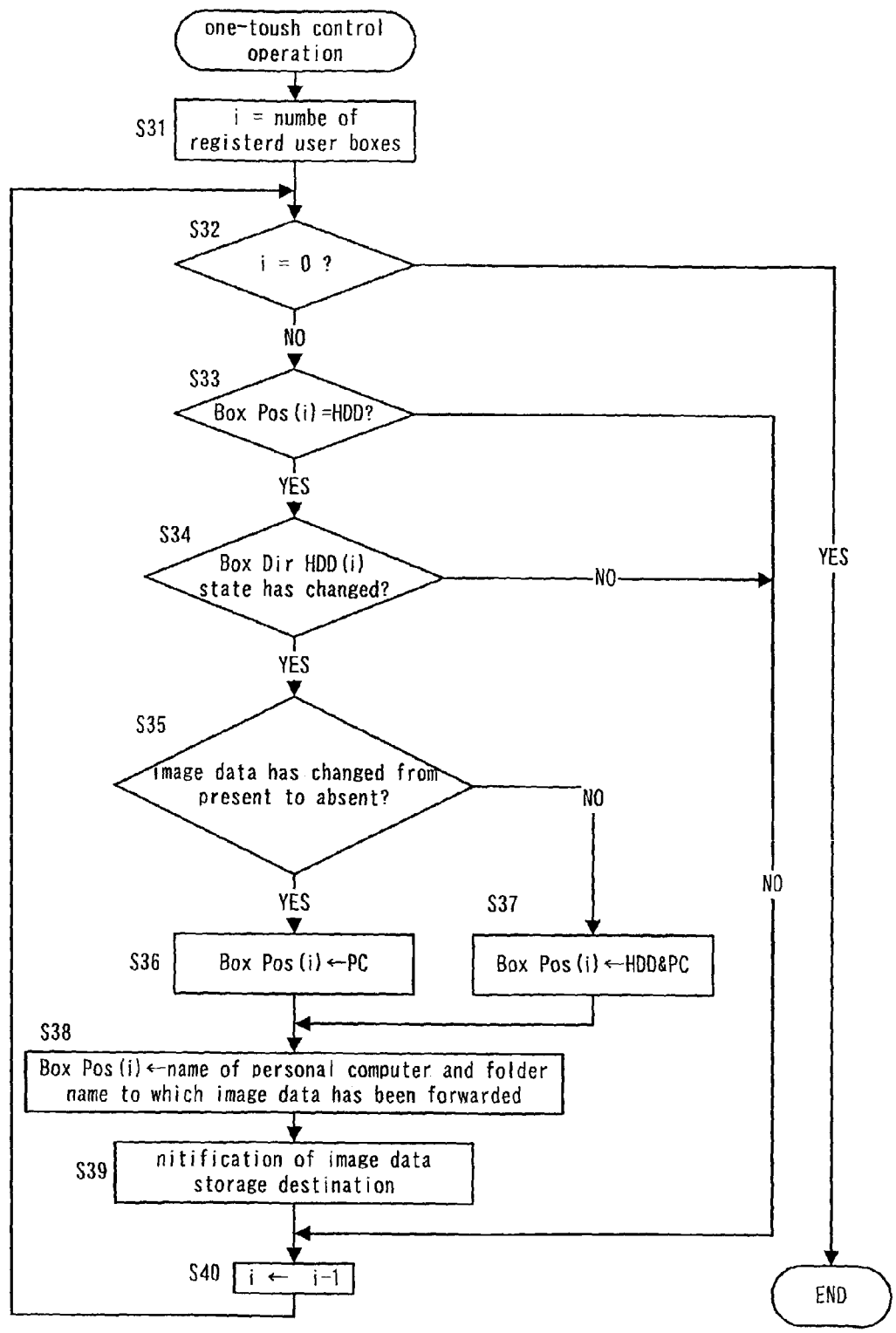
FIG. 10 is a flow chart showing in detail the one-touch control operation (S15) shown in FIG. 7.

FIG. 10 is a flow chart that shows in detail the one-touch control operation (step S15) shown in FIG. 7. This is an operation in which the image data storage destination is automatically updated from the hard disk drive.

First, the number of registered user boxes to be processed is stored as a variable (i) in step S31. It is then determined in step S32 whether or not processing regarding all of the user boxes has been completed, and if it has been completed, the one-touch control operation is ended.

Where there is a user box to process, it is determined in step S33 whether or not the image data storage destination currently registered for the user number (i) is the hard disk drive. If it is the hard disk drive, it is determined whether or not the state of the image data comprising the content of the user box indicated by (i) on the hard disk drive has changed (step S34). If it has changed from the previous state, the CPU 20 moves to the determination in the next step, i.e., step S35, wherein it is determined whether the state of the image data has changed from present to absent, i.e., whether the image data has been forwarded to the personal computer and deleted from the hard disk drive. Where the image data has been deleted, the image storage destination is changed to the personal computer only (step S36). Where the image data still remains on the hard disk drive, the storage destination is changed to both the hard disk drive and the personal computer (step S37).

In step S38, the name (or address) of the personal computer and the folder name to which the image data has been forwarded are registered as a user box for the next image data storage session. Furthermore, a notification is issued to the user indicating that that the image data storage destination has been changed (step S39). This notification can be sent in the form of an e-mail or via display on the MFP 1.

The above operations are repeated (i) times, which is the same number as the number of registered user boxes (step S40).

In the embodiment described above, a situation in which image data is transferred to one personal computer was described, but an operation in which multiple storage destinations are registered when the image data has been forwarded to multiple personal computers can be realized by storing the names of the multiple personal computers and multiple folder names in the above Box Dir PC(i).

A program that executes the operations shown in the flow charts pertaining to the above embodiment can be provided. It may be provided as recorded on a recording medium such as a CD-ROM, flexible disk, hard disk, ROM, RAM or memory card. The program may also be downloaded to the apparatus via communication circuits such as the Internet.

An MFP and personal computers were used as specific examples of the apparatuses on which data is stored in the above embodiment, but any other apparatuses having a data storage function, such as a server, PDA (personal digital assistant), scanner, printer or facsimile machine, may be used instead.

Although the present invention has been fully described by way of examples with reference to the accompanying drawings, it is to be noted that various changes and modification will be apparent to those skilled in the art. Therefore, unless such changes and modification depart from the scope of the present invention, they should be construed as being included therein.

What is claimed is:

1. A non-transitory computer-readable medium storing a computer program, which when executed by a central processing unit of a multi-function peripheral device, causes said central processing unit to perform a method, the method comprising:
   registering a location of a first storage destination of the multi-function peripheral device for image storage,
      wherein the first storage destination is internal to the multi-function peripheral device and is further designated to store image data for a single user, and
      wherein the multi-function peripheral device includes a plurality of other storage destinations designated to store image data for other users;
   storing, by the central processing unit, an image data in the registered first storage destination;
   monitoring, by the central processing unit, the first storage destination to determine if the image data has been moved by the user from the first storage destination to a second storage destination that is external to the multi-function peripheral device;
   updating, by the central processing unit, the location of the registered storage destination for storage of a subsequent image data to the second storage destination based on determination that the image data has been moved by the user to the second storage destination;
   notifying the user that the location of the storage destination has been updated; and
   automatically and without user intervention storing, by the central processing unit, the subsequent image data in the updated registered storage destination.

2. The non-transitory computer-readable medium of claim 1, wherein updating the location of the registered storage destination to the location of the second storage location occurs when the image data stored in the registered storage destination has been deleted after the moving of the image data has been detected by the detection step.

3. The non-transitory computer-readable medium of claim 1, wherein said updating further comprises updating the location of the registered storage destination to both the location of the second storage location and to the location of the storage destination registered in the registration step when the image data stored in the registered storage destination has not been deleted after the moving of the image data has been detected by the detection step.

4. The computer-readable medium of claim 1, wherein the monitoring detects that the image data has been moved from the first storage destination to the multiple different locations and the update step updates the location of the registered storage destination to multiple different locations.

5. An image processing device, comprising:
   a storage device to store image data, the storage device comprising at least one first storage location to store image data designated for a single user,
      wherein the storage device includes a plurality of other storage destinations designated to store image data for other users;
   a register which registers the first storage location with a user for image storage as a registered storage location for storing image data associated with the user;
   a storage processor which stores image data at the registered storage destination;
   a detector which monitors the first storage destination to detect if the stored image data has been moved by the user from the first storage destination to a second storage destination location external to the image processing apparatus;
   an update processor which updates the location of the registered storage destination for storage of a subsequent image data designated for the user to the second storage location based on the detection by the detector that the image data has been moved to the second storage destination,
      wherein the storage processor automatically and without user intervention stores the subsequent image data in the updated registered storage destination; and
   a notification processor which notifies the user that the location of the registered storage location has been updated by the update processor.

6. The image processing apparatus of claim 5, wherein the update processor updates the location of the registered storage destination to the location of the second storage location when the image data stored in the registered storage destination has been deleted after the moving of the image data has been detected by the detector.

7. The image processing apparatus of claim 5, wherein the update processor updates the location of the registered storage destination to both the location of the second storage location and to the location of the storage destination registered when the image data stored in the registered storage destination has not been deleted after the moving of the image data has been detected by the detector.

8. The image processing apparatus of claim 5, wherein the detector detects that the image data has been moved from the storage destination to the multiple different locations and the update processor updates the location of the registered storage destination to multiple different locations.

9. A method executed by a central processing unit of a multi-function peripheral device comprising:
   registering a location of a first storage destination of the multi-function peripheral device for image storage,
      wherein the first storage destination is internal to the multi-function peripheral device and is further designated to store image data for a single user, and
      wherein the multi-function peripheral device includes a plurality of other storage destinations designated to store image data for other users;
   storing, by the central processing unit, an image data in the registered first storage destination;
   monitoring, by the central processing unit, the first storage destination to determine if the image data has been moved by the user from the first storage destination to a second storage destination that is external to the multi-function peripheral device;
   updating, by the central processing unit, the location of the registered storage destination for storage of a subsequent image data to the second storage destination based on determination that the image data has been moved by the user to the second storage destination;
   notifying the user that the location of the storage destination has been updated; and
   automatically and without user intervention storing the subsequent image data in the updated registered storage destination.

10. The method of claim 9, wherein the update step updating the location of the registered storage destination to the location of the second storage location occurs when the image data stored in the registered storage destination has been deleted after the moving of the image data has been detected by the detection step.

11. The method of claim 9, wherein said updating further comprises updating the location of the registered storage destination to both the location of the second storage different location and to the location of the storage destination registered in the registration step when the image data stored in the registered storage destination has not been deleted after the moving of the image data has been detected by the detection step.

12. The method of claim 9, wherein the monitoring detects that the image data has been moved from the storage destination to the multiple different locations and the update step updates the location of the registered storage destination to multiple different locations.

* * * * *